United States Patent
Plettinck

(10) Patent No.: US 9,454,705 B2
(45) Date of Patent: Sep. 27, 2016

(54) METHOD AND SYSTEM FOR INSPECTING VARIABLE-DATA PRINTING

(71) Applicant: Esko Software BVBA, Ghent (BE)

(72) Inventor: Lieven Plettinck, Wingene (BE)

(73) Assignee: Esko Software BVBA, Ghent (BE)

( * ) Notice: Subject to any disclaimer, the term of this patent is extended or adjusted under 35 U.S.C. 154(b) by 20 days.

(21) Appl. No.: 14/201,849

(22) Filed: Mar. 8, 2014

(65) Prior Publication Data

US 2014/0254886 A1    Sep. 11, 2014

Related U.S. Application Data

(60) Provisional application No. 61/776,597, filed on Mar. 11, 2013.

(51) Int. Cl.
| | |
|---|---|
| G06T 5/00 | (2006.01) |
| G06K 9/03 | (2006.01) |
| G06K 9/00 | (2006.01) |

(Continued)

(52) U.S. Cl.
CPC ............. *G06K 9/036* (2013.01); *G06F 3/1208* (2013.01); *G06F 3/1244* (2013.01); *G06F 3/1256* (2013.01); *G06F 3/1285* (2013.01); *G06K 9/00442* (2013.01)

(58) Field of Classification Search
CPC  G06K 9/036; G06K 9/00442; G06F 3/1208; G06F 3/1244; G06F 3/1256; G06F 3/1285
USPC .......................... 358/3.26, 1.9; 382/112, 141
See application file for complete search history.

(56) References Cited

U.S. PATENT DOCUMENTS

| | | |
|---|---|---|
| 6,678,067 B1 | 1/2004 | Reda et al. |
| 2004/0086156 A1 | 5/2004 | Furukawa et al. |

(Continued)

FOREIGN PATENT DOCUMENTS

| | | |
|---|---|---|
| EP | 0803356 | 10/1997 |
| EP | 0781655 | 9/2001 |

(Continued)

OTHER PUBLICATIONS

"Heidelberg Prinect Press Center press control station" retrieved Dec. 11, 2012 from http://www.piworld.com/masterspecifier/?q=company&cat=5154&comp=37733.

(Continued)

*Primary Examiner* — Quang N Vo
(74) *Attorney, Agent, or Firm* — Dov Rosenfeld; Inventek

(57) ABSTRACT

Performing automatic inspection on the results of a print job that prints variable data, including multiple printed instances of a page containing variable graphics. The inspection is to detect printing defects on a printed instance. In one embodiment, the method includes dividing the page into multiple non-overlapping areas using a page division map. The non-overlapping areas include one or more static areas that include only static graphics and one or more areas that include variable graphics. The method includes capturing an image of the printed instance and, for each of the non-overlapping areas, retrieving an indication indicating whether or not the area includes any variable graphics, retrieving a rasterized image of an instant of the area from a memory location according to the indication, and comparing the rasterized image with the captured image of the area to detect any printing defects in the area of the printed instance.

11 Claims, 10 Drawing Sheets

(51) Int. Cl.
*G06F 3/12* (2006.01)
*H04N 1/407* (2006.01)

(56) References Cited

U.S. PATENT DOCUMENTS

| | | | |
|---|---|---|---|
| 2004/0179717 A1* | 9/2004 | Furukawa | G06T 7/001 382/112 |
| 2009/0148004 A1 | 6/2009 | Kimura | |
| 2011/0216345 A1 | 9/2011 | Horn | |
| 2011/0222106 A1 | 9/2011 | Grodsky et al. | |
| 2011/0268354 A1* | 11/2011 | Muninder | G06K 9/0061 382/164 |
| 2012/0070040 A1 | 3/2012 | Vans et al. | |

FOREIGN PATENT DOCUMENTS

| | | |
|---|---|---|
| WO | WO 95/31333 | 11/1995 |
| WO | WO 2005/104659 | 11/2005 |
| WO | WO 2007/086052 | 8/2007 |
| WO | WO 2008/107892 | 9/2008 |

OTHER PUBLICATIONS

"Prinect Color and Quality: Multicolor Workflow" retrieved Dec. 11, 2012 from http://www.heidelberg.com/www/binaries/bin/files/dotcom/en/prinect/multicolor_en.pdf. Printed Oct. 2009.

"The Heidelberg Prinect Press Center" retrieved Dec. 11, 2012 from http://www.heidelberg.com/www/binaries/bin/files/dotcom/en/products/prinect/press_center.pdf.

"JDF—Integration and Automation" retrieved Nov. 24, 2011 from http://www.hdm-stuttgart.de/international_circle/circular/issues/08_01/ICJ_01_04_hoffmann-walbeck.pdf.

Wikipedia article titled "Composite pattern" retrieved Dec. 7, 2011 from http://en.wikipedia.org/wiki/Composite_pattern.

Wikipedia article titled "International Color Consortium" retrieved Dec. 7, 2011 from http://en.wikipedia.org/wiki/International_Color_Consortium.

Wikipedia article titled "Job Definition Format" retrieved Dec. 8, 2011 from http://en.wikipedia.org/wiki/Job_Definition_Format.

Wikipedia article titled "Scalable Vector Graphics" retrieved Dec. 7, 2011 from http://en.wikipedia.org/wiki/Svg.

Thomas Hoffmann-Walbeck: JDF—Integration and Automation, International Circle of Educational Institutes for Graphic Arts Technology and Management (IC), Issue No. 1 2008, article retrieved Nov. 24, 2011 at http://www.hdm-stuttgart.de/international_circle/circular/issues/08_01/ICJ_Computer-Aided Inspection Planning-The state of the art01_04_hoffmann-walbeck.pdf. Also available at: http://web.archive.org/web/20100916221458/http://www.eyec.de/eyec-en/02-products/04-proofrunner-en.html.

Fiona Zhao, Xun Xu, S. Q. Xie: Computer-Aided Inspection Planning—The state of the art, Computers in Industry, vol. 60, Issue 7, Sep. 2009, pp. 453-466.

\* cited by examiner

METHOD AND SYSTEM FOR INSPECTING VARIABLE-DATA PRINTING

RELATED APPLICATION(S)

The present invention claims priority of, and is a non-provisional of U.S. Provisional Patent Application No. 61/776,597 filed 11 Mar. 2013 to Applicant Esko Software BVBA, and inventor Plettinck, the content of which are incorporated herein by reference.

FIELD OF THE INVENTION

The present disclosure relates generally to digital printing. More particularly, the present disclosure relates to inspecting printing defects on multiple printed instances of a page containing variable data.

BACKGROUND

A digital printing press is commonly used in the packaging and labelling industry for producing packaging items and labels. For certain merchandises, e.g., pharmaceuticals and food, there is a requirement to have zero defects on packaging items and labels, as printing errors can affect readability of sensitive information such as a warning statement and/or an ingredient list. Because the printing process itself is not perfect, zero defects can only be achieved by inspecting every printed instance and removing or correcting those with printing defects before sending printed instances to customers.

Because inspection by humans is slow, expensive and by no means guaranteed to catch all print defects, automated inspection systems are used in the industry. Such inspection system uses cameras to capture images of printed instances and processors to execute analysis algorithms on the captured images to check for presence of printing defects. This is done by comparing each captured image with a reference image of the packaging item or label. The reference image can be an image of a printed instance that is captured at the beginning of the print job and has been inspected by a human operator and found to be defect free. In more modern systems, the reference image is an image generated by a raster image processor (RIP) according to a page description language (PDL) that describes the graphics elements of the packaging item or label. Examples of the PDL are PostScript and Portable Document Format (PDF) by Adobe Systems, Inc., Mountain View, Calif.

The approach as described above works well when the packaging item or label is identical for all printed instances. More and more packaging items and labels, however, contain graphic or text elements that vary from instance to instance such as serial numbers, track and trace elements, and variable barcodes. The variable data makes each printed instance unique. The areas of the packaging item or label containing variable data are problematic for existing inspection systems. Since these areas are different for every printed instance, it is no longer possible to compare these areas to corresponding areas of the same reference image. Some inspection systems use Optical Character Recognition (OCR) techniques or barcode quality analysis algorithms for areas affected by variable text or variable barcodes to verify that the correct text or barcode is printed. These algorithms, however, are not able to detect printing defects such as spots, smears, and color shift.

An intuitive solution to the problem would be to have a reference image for every printed instance of the packaging item or label. Such a solution suggests a large set of reference images (one for each instance), which cannot be captured from the beginning of a printing job. In theory, the large set of reference images could be generated by using an RIP system to process a PDL file that represents the complete job of printing. A file in the ISO PDF/VT standard format, for example, can define one or more pages of which each page represents one printing target, e.g., a packaging label. Each page may contain multiple graphics elements including static graphics elements, which are identical for every printed instance of the page, and variable graphics elements, which are unique for every printed instance of the page. Using an RIP system, a set of reference images could be generated for every instance of a page and for every page of the printing job represented by the PDF/VT file. Each of the reference images would contain all static and variable graphics for one instance of a page. An inspection system could then compare a captured image of every printed instance to its corresponding reference image. Unfortunately, such a system is not practical as storage requirements (storing a complete unique image for every instance of a page) and bandwidth requirements (reading all the data for the complete unique image for every printed instance at the printing speed) are prohibitive.

Thus, in digital printing presses that deal with variable data, namely variable-data printing, there is a need for an inspection system and method that allow automatic inspection of printing defects on printed instances at the speed of printing.

DESCRIPTION OF EXAMPLE EMBODIMENTS

Figure 1:
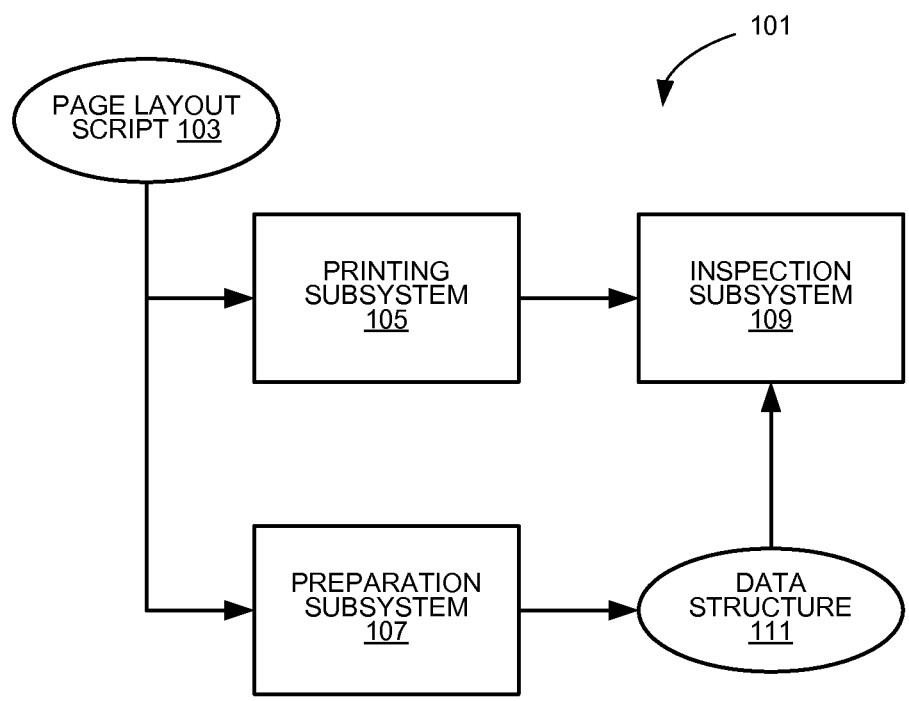
FIG. 1 is a block diagram depicting a system that includes an embodiment of the present invention as part of the system for inspecting a job of variable-data printing.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be used without departing from the principles described herein.

Overview

Methodologies are presented herein for performing automatic inspection on a job of printing that prints variable data. The printing is to generate a sequence of printed instances of a page. The page includes a plurality of elements including one or more static elements that are fixed from instance to instance and one or more variable elements that vary from instance to instance. The methodologies include inspecting printed instances of the page at the speed of printing for printing defects, using a data structure prepared to facilitate the inspecting.

Particular embodiments include a method and a system operable to carry out a method for inspecting a job of printing. The inspecting is to detect any printing defects on a printed instance of a page that contains variable data. The method includes dividing the page into multiple non-overlapping areas using a division map prepared for the page. The non-overlapping areas include one or more areas that include no variable graphics, but only static element(s) or part(s) thereof, and one or more areas that include at least a variable part of at least one variable element, possibly with one or more static elements or parts thereof. Each non-overlapping area has a unique area-identifier, e.g., an index according to the division map. The method includes capturing an image of the printed instance and, for each of the non-overlapping areas of the page, retrieving an indication from a pre-stored data structure indicating whether the area includes no variable data or the area includes at least a variable part of a variable element. The method further includes retrieving a rasterized image from a memory location according to the indication. The rasterized image is generated by rasterizing the elements in the area prior to printing. The method includes comparing the rasterized image with the area of the captured image to detect any printing defects in the area of the printed instance.

In one embodiment, the retrieving a rasterized image according to the indication is as follows. In the case that the indication indicates that the area includes only static graphics, the method includes retrieving a rasterized static image from a first memory location. The rasterized static image is generated by rasterizing the static element(s) and/or part(s) in the area of the page. In the case that the indication indicates that the area of the page includes at least a variable part of at least one variable element, the method includes retrieving a rasterized variable image from a second memory location. The rasterized variable image is determined among a set of rasterized variable images that each represents one instance of the area's variable and/or variable element part(s) and any static graphics, and the determination is by using a unique instance-identifier, e.g., an index of the instance in the sequence. The first and the second memory locations are accessed using the area-identifier, e.g., index of the area according to the division map.

Particular embodiments also include a method for preparing a data structure for inspecting a job of printing. The inspecting is to detect any printing defects on a printed instance of a page that contains variable data. The method includes dividing the page into multiple non-overlapping areas. The non-overlapping areas include one or more areas that do not include any variable graphics, and one or more areas that each includes at least a variable part of at least one variable element. The dividing generates a division map in the data structure. Each non-overlapping area has a unique area-identifier, e.g., index according to the division map. The method includes, for each of the non-overlapping areas, generating an indication for the area in the data structure that indicates whether the area includes no variable graphics, or the area includes one or more variable elements. The method further includes generating one or a set of rasterized images for the area and storing the one or a set of rasterized images in a memory location as part of the data structure. The generating and storing are according to the indication.

In one embodiment, the generating and storing the one or more images according to the indication is as follows. For an area whose indication indicates that the area does not include any variable element(s) or part(s) thereof, the method includes rasterizing the static element(s) and static element part(s) in the area to generate a rasterized static image and storing the rasterized static image in a first memory location. In the case that the indication indicates that the area includes at least a variable part of a variable element, the method includes rasterizing the variable element(s) and/or variable parts and any static data in the area to generate a set of rasterized variable images, each of the rasterized variable images representing one instance of the included variable graphics, and storing the set of rasterized variable images in a second memory location. The set of rasterized variable images are stored according to a unique instance-identifier, e.g., index of the instance in the sequence. The first and the second memory locations are accessible by using the area-identifier, e.g., index of the area according to the division map.

Embodiments of the method and system described herein allow inspection of variable-data printing to be conducted automatically and even at a speed not lower than the printing.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

DESCRIPTION OF EMBODIMENTS

The described embodiments of the invention can be used as part of a complete system for a digital printing press, for which inspection is required to detect printed instances that have printing defects such as spots, smears, and color shift. A printing job in the digital printing press includes printing one or more pages of which at least one page contains variable data, e.g., a packaging item or label that contains serial numbers, track and trace elements, and variable barcodes. The variable data makes each printed instance of the page unique.

An example embodiment of such a system is illustrated in block-diagram form as 101 in FIG. 1. The system 101 includes a printing subsystem 105 operative to print a sequence of variable instances of a page represented by a page layout script 103. For inspecting printing defects on each printed instance output by the printing subsystem 105, the system 101 includes a preparation subsystem 107 that generates a data structure 111 according to the page layout script 103. The system 101 further includes an inspection subsystem 109 operative to inspect each printed instance output by the printing system 105 using the data structure 111 generated by the preparation subsystem 107. In one embodiment, the data structure 111 is generated by the preparation subsystem 107 prior to printing and stored for retrieval by the inspection subsystem 109.

The Printing Subsystem 105

The printing subsystem 105 may be any digital printing system operable for printing a page containing variable data, such as those manufactured by Esko of Ghent, Belgium, related to the assignee of the present invention, and others. Configuration of the printing subsystem 105 described herein is solely for completeness of the disclosure, and shall not be considered in any way to limit the invention.

In a typical configuration, the printing subsystem 105 includes one or more prepress workstations, all connected to a bus or a local area network ("LAN"), or even a larger network, e.g., the Internet. More or fewer workstations may be part of the subsystem 105. Each workstation may be a standard computer, and may contain several software modules, including prepress software such as Adobe Illustrator, Adobe Photoshop and/or Adobe Pagemaker, by Adobe, Inc. of Mountain View, Calif., and/or QuarkXpress, by Quark, Inc., of Denver, Colo. The prepress software is used by a designer to create different individual elements that make up a page. A page includes a plurality of graphic elements some of which are static from instance to instance and some of which vary across instances. By a "static element" of a page is meant a page element that is fixed/static from instance to instance of the page, and by "variable element" is meant a page element that might vary from instance to instance of the page. In one embodiment, the page elements are stored in a PDL form, e.g., in a storage subsystem coupled to or part of one or more of the workstations.

A designer specifies the overall design of the page in the page layout script 103. The page layout script 103 maps the set of page elements required by the page and such page elements are processed from the corresponding PDL files by methods known in the art.

The static elements and the variable elements of each page are combined according to the page layout script 103 and input to one or more rasterizers that are part of an RIP module that is operative to rasterize data into rasterized data suitable for input to a printing device. The RIP module is connected to the prepress workstation(s) over the bus or LAN. More or fewer rasterizers can be used, or the RIP module may be implemented as software operating in the workstation(s).

The printing device is operative to print the rasterized data to produce a printed instance of the page. When in operation, the RIP module continues generating rasterized data for each instance of the page suitable for input to the printing device for printing, and the printing device prints the instance. Thus, a sequence of printed instances of the page is output by the printing subsystem 105 at high speed.

The Preparation Subsystem 107

In one version, the page layout script 103 is also used by the preparation subsystem 107 of the system 101 to generate the data structure 111 for inspecting every printed instance output by the printing subsystem 105. The data structure 111 is prepared to facilitate storage and transmission such that when the data structure 111 is used by the inspection subsystem 109 for inspecting according to one embodiment of the present invention, the inspection subsystem 109 is operative to perform automatic inspection, e.g., at the speed that printed instances are produced by the printing subsystem 105.

Figure 2:
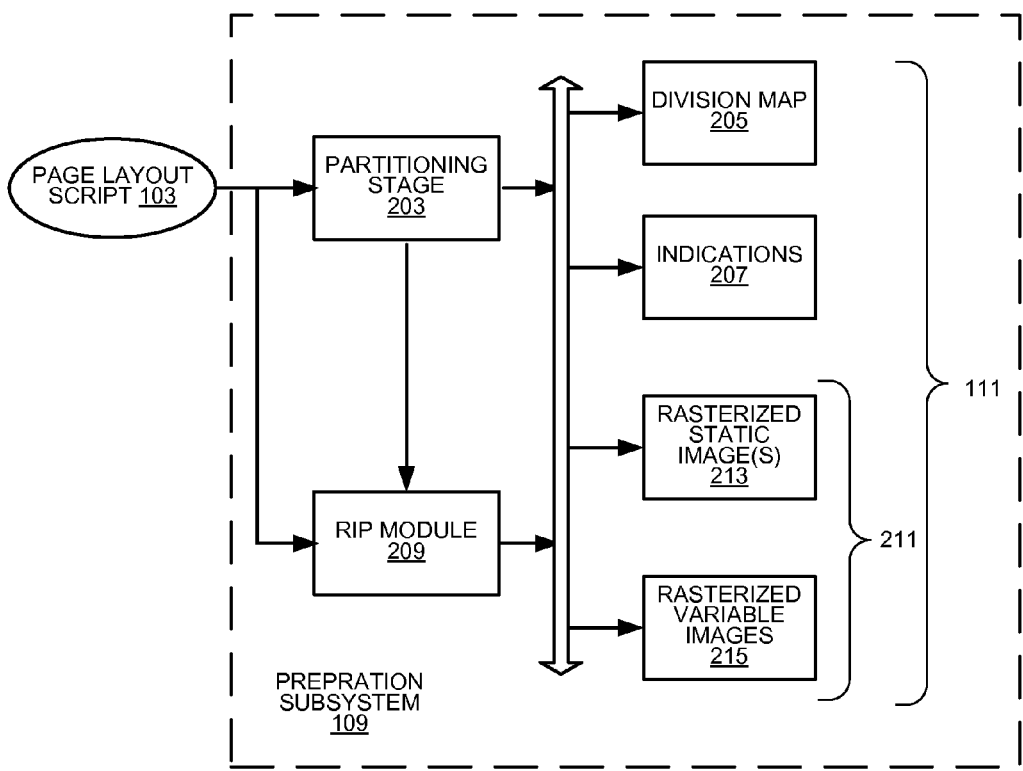
FIG. 2 is a block diagram showing an example embodiment of the present invention for preparing a data structure for inspecting a job of variable-data printing.

FIG. 2 shows an example embodiment of the preparation subsystem 107. The preparation subsystem 107 includes a partitioning stage 203 that is operative to determine a division map 205 for the page represented by the page layout script 103. The page is divided into multiple non-overlapping areas according to the division map 205. Each of the non-overlapping areas contains one or more page elements and/or parts thereof, each of which may be static or variable. Some areas contain no variable element or variable part of a variable element, while other contain at least avariable part of a variable element. Along with the division map 205, an indication 207 is created for every non-overlapping area, which indicates whether the area contains no variable element or variable part of a variable element, or the area contains at least a variable part of one variable element.

Figure 3A:
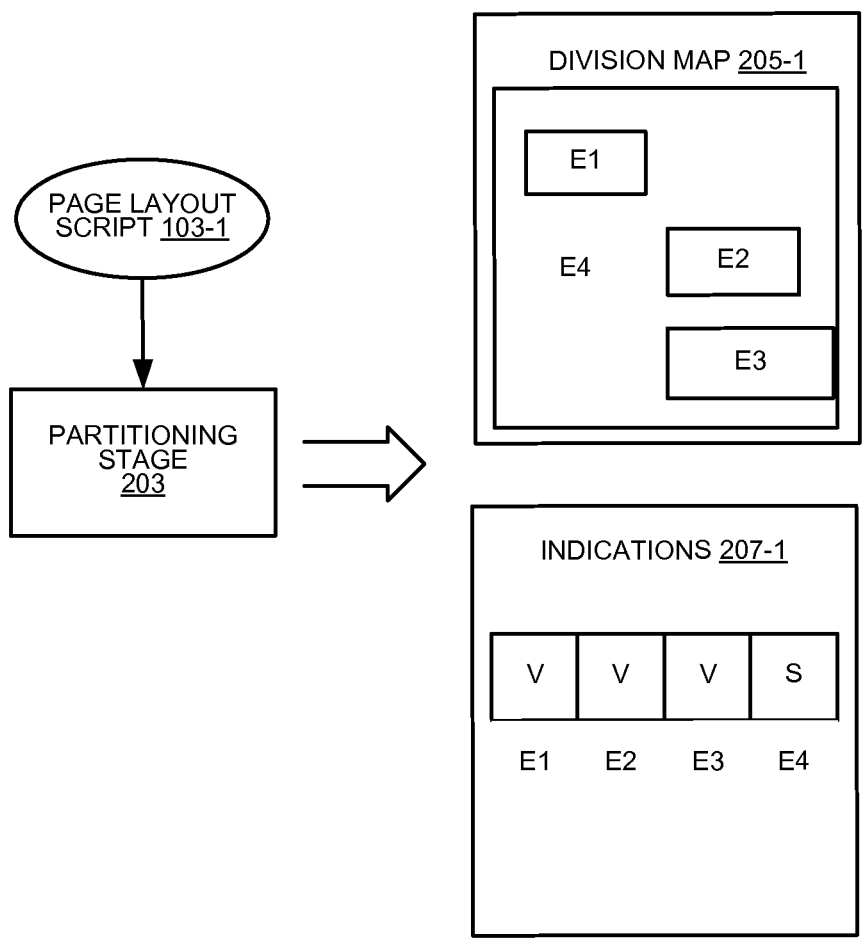
FIG. 3A shows an example of dividing a page into multiple non-overlapping areas as part of the preparing a data structure for inspecting a job of variable-data printing. Some of the non-overlapping areas contain only static graphics, i.e., only static elements and/or parts thereof. Other non-overlapping areas contain variable graphics, e.g., at least a variable part of a variable element, possibly with static elements or parts thereof.
Figure 3B:
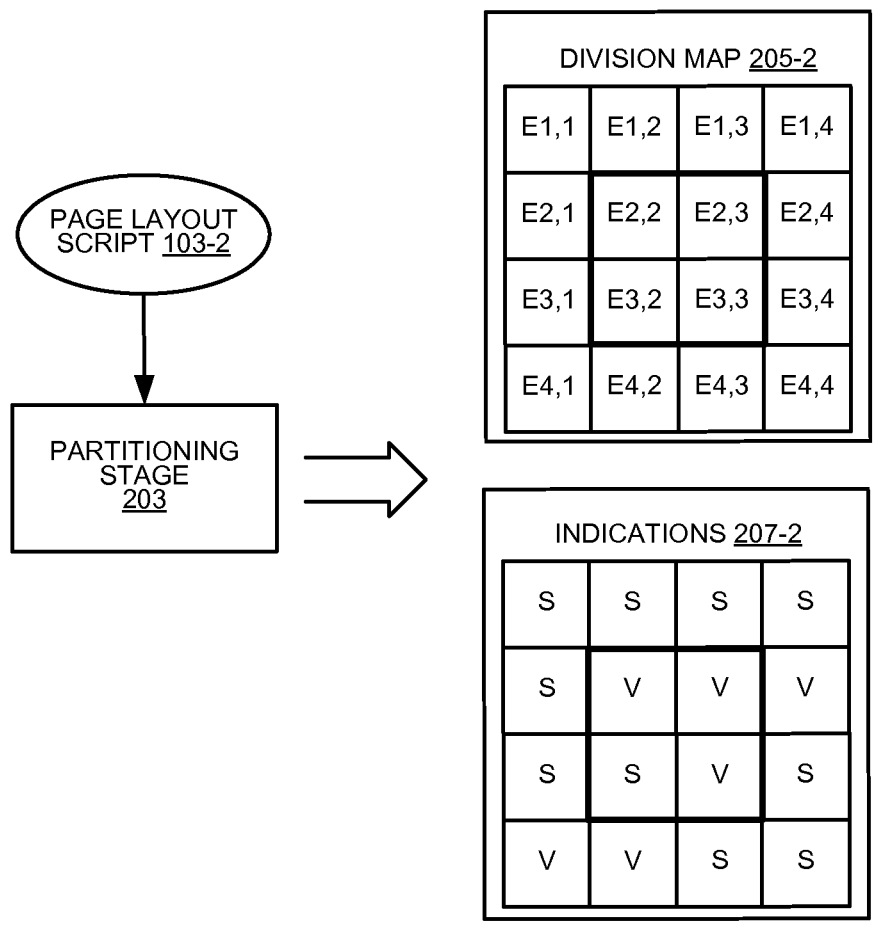
FIG. 3B shows another example of dividing a page into multiple non-overlapping areas, in which the division is in a form of a two-dimensional matrix and the areas are rectangular tiles having the same size.

FIGS. 3A and 3B show example embodiments of the division map 205 and the indications 207.

FIG. 3A shows schematically and in simplified form that a page represented by a page layout script 103-1 is divided by the partitioning stage 203 into four non-overlapping areas, denoted by E1, E2, E3, and E4, where the numbers 1, 2, 3, and 4 are indices of the areas. The areas E1, E2, and E3 are three rectangular regions having different sizes within the page, and the area E4 is the remaining region of the page after the three rectangular regions are excluded. The division results in a division map 205-1. Along with the division map 205-1, indications 207-1 are also generated, each indication corresponding to one of the areas E1 to E4. The indications 207-1 are organized in the same sequence as the areas indexed by the area identifier to facilitate later retrieval of the indications. Each indication indicates whether or not the corresponding non-overlapping area in the page contains any variable element or a variable part of an element. This can be represented by a binary code or any symbols interpretable to a binary code. In FIG. 3A, for example, a symbol 'S' is used to indicate that the corresponding area contains no variable data, i.e., not even one variable part of any variable element, whereas a symbol 'V' is used to indicate that the corresponding area contains at least a variable part of a variable elements, possibly with one or more static elements or parts thereof. In this example, the indications 207-1 indicate that the areas E1, E2, and E3 contain variable data (some elements of which may be static) whereas the area E4, i.e., the remaining area of the page contains only static data.

FIG. 3B shows, in another example embodiment, that a page represented by a page layout script 103-2 is divided by the partitioning stage 203 into non-overlapping rectangular tiles, denoted as Ei, j wherein (i, j) is a two-dimensional identifier denoting the position of the tile/area Ei, j in the matrix. All the non-overlapping areas have the same size. In this example, the resulting division map 205-2 has a two-dimensional matrix form. Similarly, the indications 207-2 are also organized in a two-dimensional matrix form. Each element of the indication matrix corresponds to the same element in the division map matrix, indicating whether the corresponding area in the page contains any variable portion.

Reference now is back to the system and associated method shown in FIG. 2. The preparation subsystem 107 also includes an RIP module 209 that comprises one or more rasterizers. The RIP module 209 may be the same module used by the printing subsystem 105 in rasterizing the elements of the page into rasterized data suitable for input to a printing device, or it may be a separate RIP module. The RIP module 209 operates according to the division map 205 and the indications 207 generated by the partitioning stage 203, and generates a number of rasterized images 211. In particular, the RIP module 209 generates one rasterized static image 213 for each non-overlapping area containing only static graphics, i.e., only static element(s) and/or static parts, by rasterizing the static element(s) and any static part(s) in the area. For each non-overlapping area containing at least one variable element or variable part of a variable element, the RIP module 209 generates a set of rasterized variable images 215 that each corresponds to one instance of the variable element and any static graphics in that area. The rasterized images 211 along with the division map 205 and the indications 207 are stored for retrieval by the inspection system 109 at the time of inspecting.

Figure 4A:
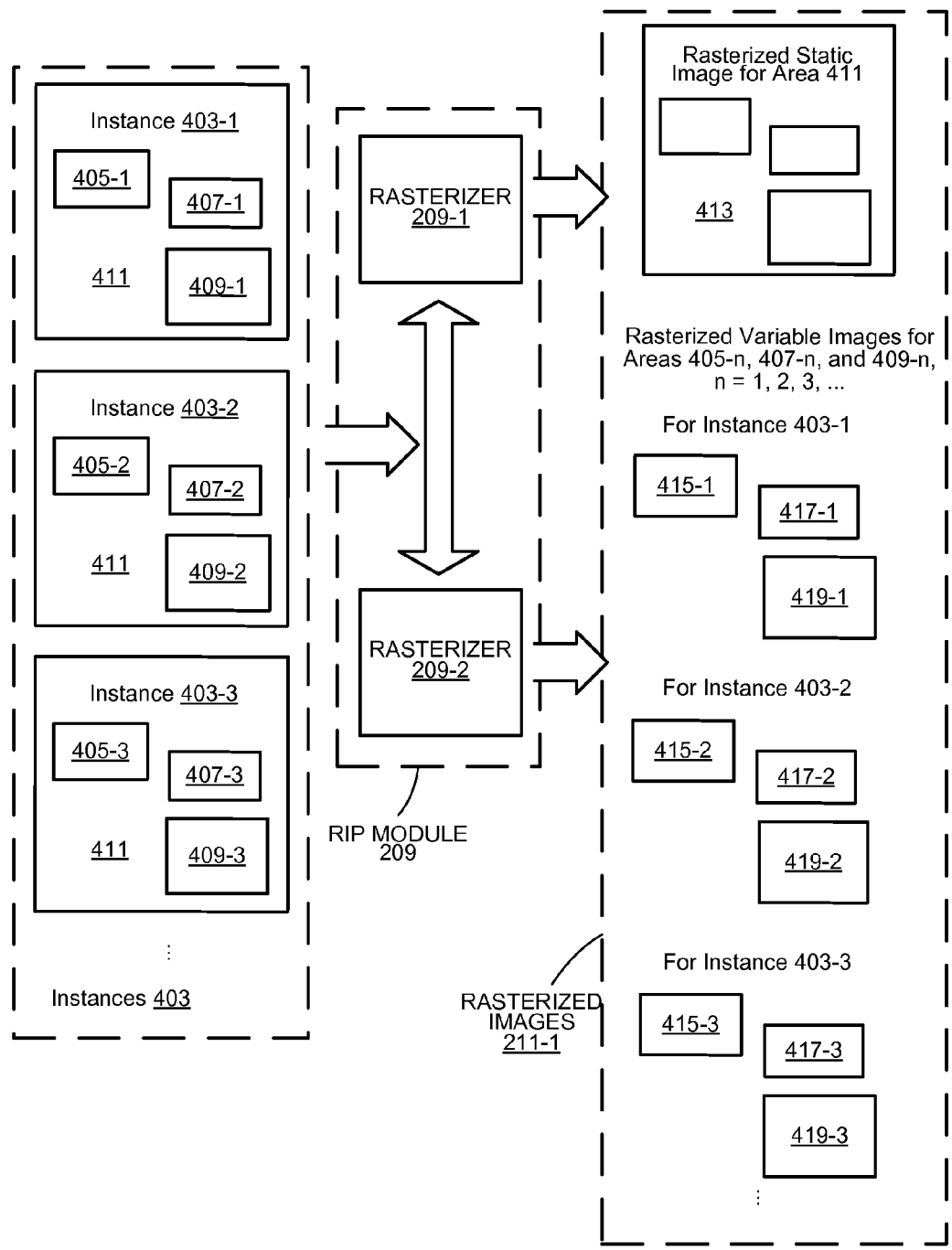
FIG. 4A shows an example of generating a number of rasterized images for a page divided into multiple non-overlapping areas, including one rasterized image for each area containing only static elements and/or parts thereof, and a set of rasterized images for each area containing variable graphics (possibly with static elements or parts thereof), one rasterized image for each instance of the area. The division is in a form similar to that shown in FIG. 3A.
Figure 4B:
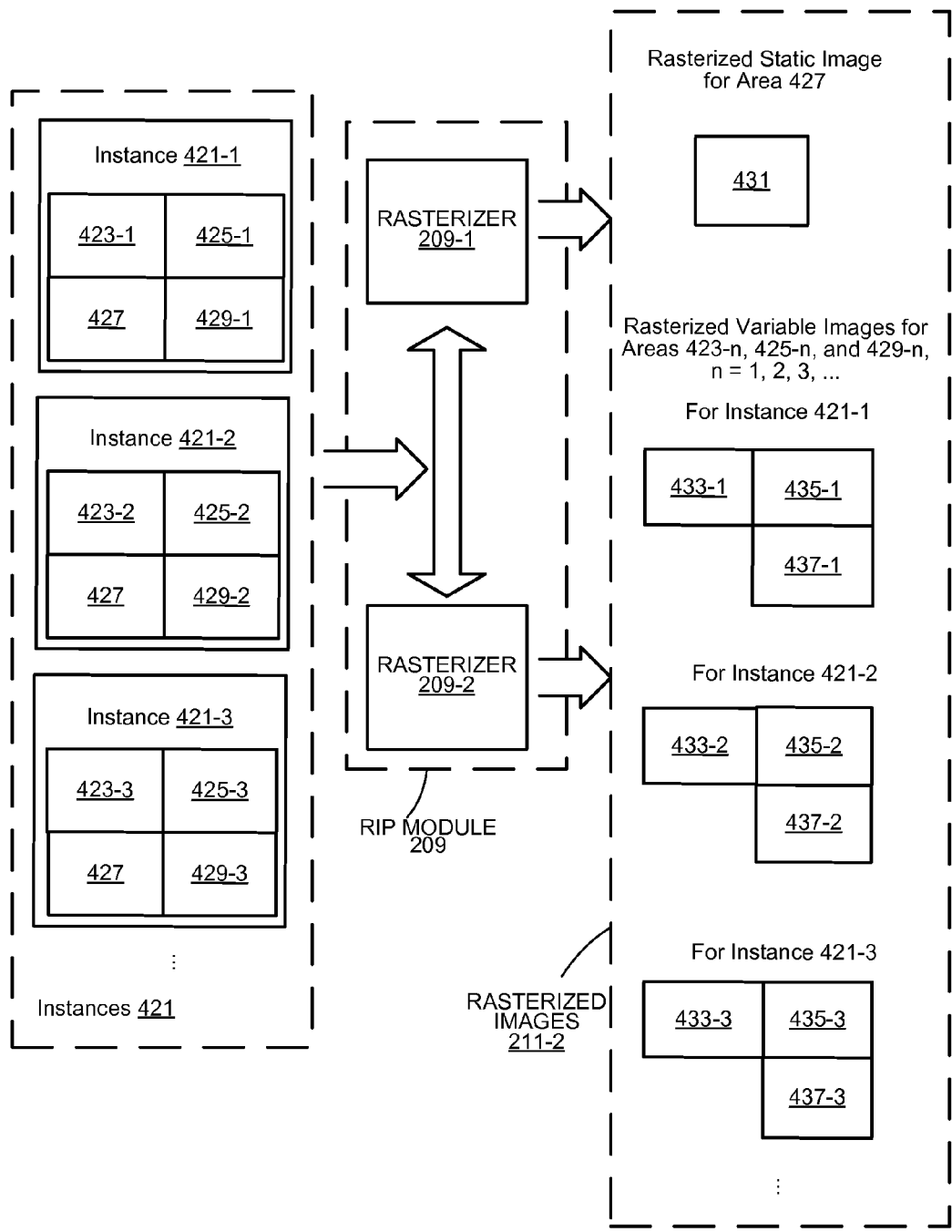
FIG. 4B shows another example of generating a number of rasterized images for a page divided into multiple non-overlapping areas. The division is in a form similar to that shown in FIG. 3B.

FIGS. 4A and 4B illustrate the generation of the rasterized images 211 with two examples.

FIG. 4A shows the generation of rasterizes images for instances 403 that are instances of a page represented by a page layout script similar to 103-1 in FIG. 3A. The instances 403 include instance 403-1, 403-2, 403-3, . . . , which are denoted in general as 403-$n$ with n being an index used as an instance-identifier of the instances, i.e., n=1, 2, 3, . . . . The page and the instances 403 are divided into non-overlapping areas according to a division map similar to that in FIG. 3A. In particular, an instance 403-$n$ includes three non-overlapping areas 405-$n$, 407-$n$, and 409-$n$ that contain variable data, n=1, 2, 3, . . . , and one area 411 that is static, i.e., that contains no element or part that varies across instanced.

Also shown in FIG. 4A are two rasterizers 209-1 and 209-2 that form the RIP module 209 of the preparation subsystem 107. The RIP module 209 generates a number of rasterized images 211-1. In particular, the rasterizer 209-1 generates a rasterized static image 413 for the area 411 by rasterizing the static elements in the area 411. The rasterizer 209-2 generates a sequence of rasterized variable images 415-$n$, one for each instance of the area represented by 405-$n$, a sequence of rasterized variable images 417-$n$, one for each instance of the area represented by 407-$n$, and a sequence of rasterized variable images 419-$n$, one for each instance of the area represented by 409-$n$. The generation results in a set of rasterized variable images {415-1, 417-1, 419-1} for the instance 403-1, a set of rasterized variable images {415-2, 417-2, 419-2} for the instance 403-2, a set of rasterized variable images {415-3, 417-3, 419-3} for the instance 403-3, and so forth, along with a rasterized static image 413 fixed for all the instances.

FIG. 4B shows another example of the generation of rasterized images, for a page represented by a page layout script similar to 103-2 in FIG. 3B. The page, and the instances 421 of the page are divided into non-overlapping rectangular areas according to a division map similar to that in FIG. 3B. In particular, each instance 421-$n$ includes three non-overlapping areas 423-$n$, 425-$n$, and 429-$n$, n=1, 2, 3, . . . , that contain variable data, with n denoting the variation across instances, and one area 427 that contains only static graphics that do not varying across instances.

Similar to FIG. 4A, two rasterizers 209-1 and 209-2 are used. The rasterizer 209-1 generates a rasterized static image 431 for the area 427 by rasterizing the static elements in the area 427. The rasterizer 209-2 generates a sequence of rasterized variable images 433-$n$, one for each instance of the area represented by 423-$n$, a sequence of rasterized variable images 435-$n$, one for each instance of the area represented by 425-$n$, and a sequence of rasterized variable images 437-$n$, one for each instance of the area represented by 429-$n$, with n denoting the instance-identifier, in this case an index. The generation results in a set of rasterized variable images {433-1, 435-1, 437-1} for the instance 421-1, a set of rasterized variable images {433-2, 435-2, 437-2} for the instance 421-2, a set of rasterized variable images {433-3, 435-3, 437-3} for the instance 421-3, and so forth, along with a rasterized static image 431 fixed for all the instances.

It is worth to note that the rasterizers 209-1 and 209-2 shown in FIGS. 4A and 4B are for illustration only. More or fewer rasterizers may be used to generate rasterized static images and/or rasterized variable images. Also, a rasterizer may be used to generate both rasterized static images and rasterized variable images. In one embodiment, the RIP module 209 and the partitioning stage 203 are both implemented as software operating in a computer system.

Each rasterized static image 213 and each set of rasterized variable images 215 are stored in a memory location, respectively, for retrieval by the inspection subsystem 109 at the time of inspecting. The memory locations are accessible by the inspection subsystem 109. In one embodiment, the memory locations are included in the indications 207 as part of the data structure 111. For example, an indication 207 for a non-overlapping area may not only contain a binary code that indicates whether the area contains a variable element, but also a pointer to a memory location for the area in which the rasterized static image 213 or the set of rasterized variable images 215 corresponding to the area are stored. In one particular example, the memory locations for storing rasterized static images 213 may be fixed and hence always known to the inspection subsystem 109, and accessible using only the area-identifier of the area in the division map 205. Thus, for an area containing only static element(s), a pointer to the memory location storing the rasterized static image 213 for the area does not need to be included in the indication 207 of the area. In this case, a binary code for indicating whether an area contains a variable element may be combined with the pointer to a memory location by using a NULL pointer, i.e., a pointer being zero or pointing to an empty location.

By preparing the data structure 111 as described above, the preparation subsystem 107 provides reduced storage and transmission requirements for the inspection subsystem 109 and makes automatic inspection possible at the speed that printed instances are produced by the printing subsystem 105.

The Inspection Subsystem 109

Figure 5:
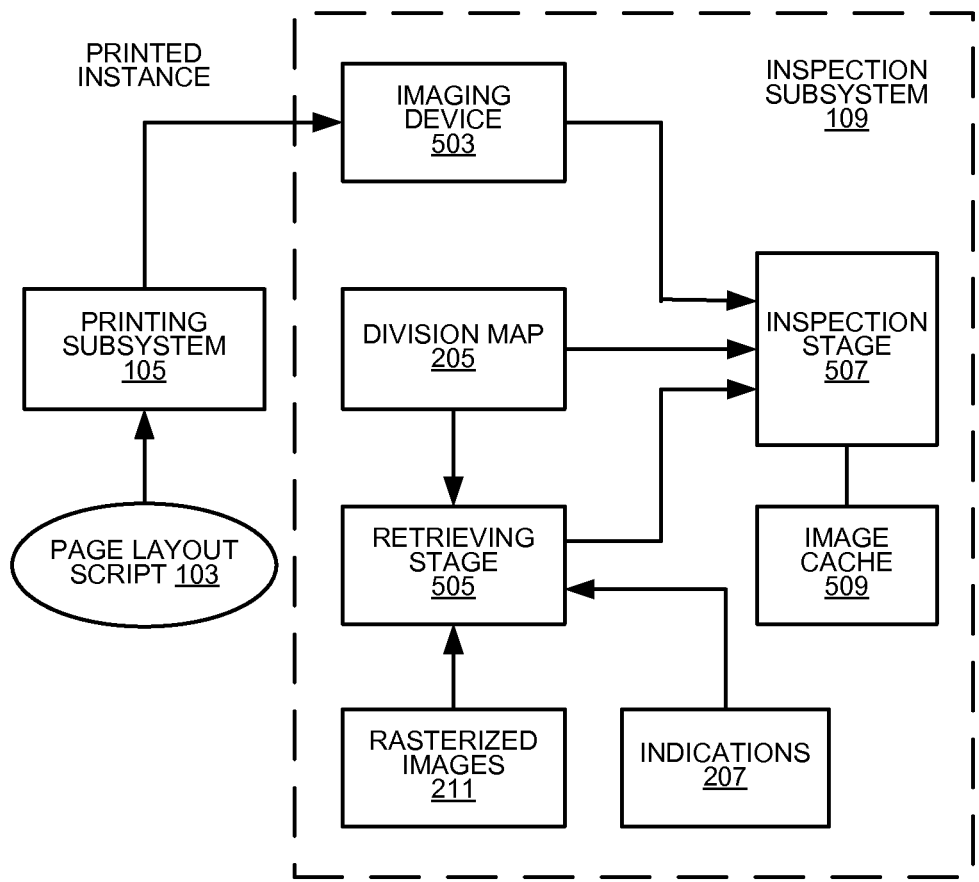
FIG. 5 is a block diagram showing an example embodiment of the present invention for inspecting a job of variable-data printing using a data structure prepared for inspecting. The data structure is prepared according to one embodiment of the present invention as illustrated in FIG. 2.

FIG. 5 shows an example embodiment of the inspection subsystem 109 that carries out a method of inspection according to an aspect of the invention. The inspection subsystem 109 includes an imaging device 503 that in one embodiment is a camera, e.g., a charge-coupled device (CCD) line-scan camera. A line-scan camera has a single row of pixel sensors in contrast to a regular camera that has a matrix of pixel sensors. Frames captured by the camera are continuously fed to a computer that joins them to each other and makes an image. This makes possible sharp pictures of printed instances that may be passing the camera at high speed. The invention of course is not limited to line-scan cameras or CCD cameras, e.g., the camera may be a two-dimensional camera. The camera may use a CMOS or some other sensor, and so forth.

One embodiment provides for inspecting the printed instances at the same high speed as the printing, while other embodiments need not. For inspecting the printed instances, the inspection subsystem 107 uses the data structure 111 generated by the preparation subsystem 109. In particular, for a page represented by a page layout script 103, the inspection subsystem 109 uses the division map 205 generated for the page to divide the page into multiple non-overlapping areas. For each of the non-overlapping areas, the inspection subsystem 109 reads in the indication 207 generated for the area that indicates whether or not the area contains any variable graphics, and a pointer to a memory location in which a rasterized static image 213 or a set of rasterized variable images 215 are stored for the area. The inspection subsystem 107 includes a retrieving stage 505 configured and operative to retrieve the indication 207 and the rasterized static image 213 or the set of rasterized variable images 215 according to the indication 207.

Figure 6:
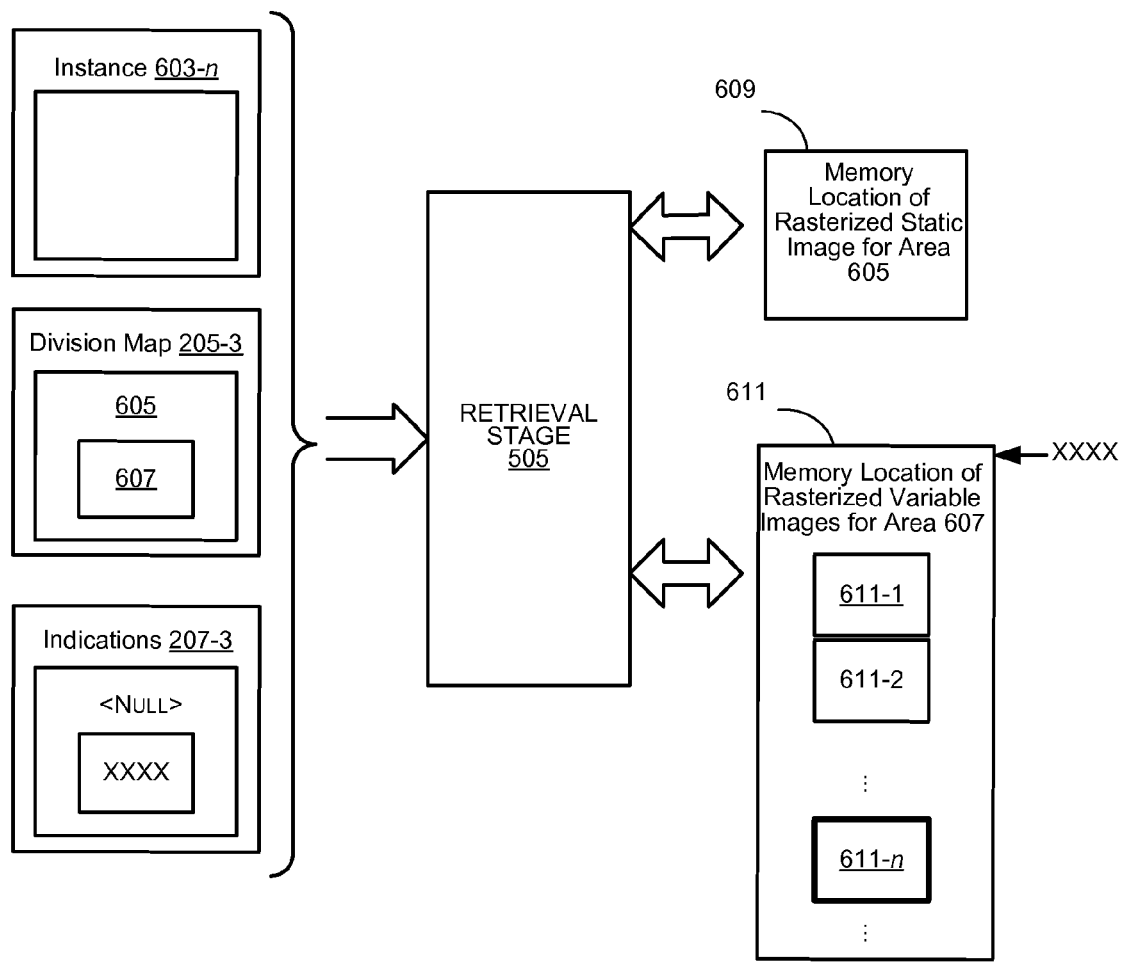
FIG. 6 is an illustration of retrieving a rasterized image for inspecting printing defects on an area of a printed instance of a page according to an indication of whether the area contains at least some variable graphics, or only static graphics, as part of using a prepared data structure for inspecting a job of variable-data printing, according to an aspect of the invention.

FIG. 6 shows an illustration of the retrieving stage 505 in performing the retrieving for an instance 603-n of a page, where n denotes the index, i.e., instance-identifier of the instance in the printing sequence. Using the division map 205-3, the retrieving stage 505 divides the page into two non-overlapping areas: a background area 605 and a foreground rectangular area 607. The retrieving stage 505 first reads in the indication 207-3 for the area 605, which is a NULL pointer, indicating that the area 605 contains only static element(s). The retrieving stage 505 then accesses a known memory location 609 to retrieving the rasterized static image for the area 605. For the area 607, the retrieving stage obtains a non-zero pointer to a memory location 609 by reading in the indication 207-3 for the area 609. The retrieving stage 505 then accesses the rasterized variable images for the area 607 using the memory location 609. The memory location 611 consists of a number of sub-locations 611-1, 611-2, . . . , each storing one rasterized variable image that corresponds to one instance of the variable element(s) in the area 607. The retrieving stage 505 further uses the instance-identifier (index) n to determine a memory sub-location 611-n for retrieving the rasterized variable image corresponding to the instance 603-n.

Reference now is back to FIG. 5. Both the image captured by the imaging device 503 and the rasterized images retrieved by the retrieving stage 505 are input to an inspection stage 507. The inspection stage 507 is configured to carry out an image analysis algorithm. By executing the image analysis algorithm, the inspection stage 507 analyzes, for each of the non-overlapping areas according to the division map 205, whether the area in the captured image of a printed instance contains printing defects. This is achieved by comparing the area of the captured image to the rasterized image retrieved by the retrieving stage 505, as the rasterized image provides a defect-free version of the area for the particular instance.

Image analysis algorithms suitable for performing comparison between an area of a captured image and a rasterized image are known in the art. One simple example is to calculate absolute differences of pixels from the two images and check whether the maximum absolute difference is beyond a pre-defined threshold, or whether the number of pixels having a non-zero absolution difference is beyond a pre-defined threshold. Another example is to generate color histograms for the two images and compare the color histograms to check whether the two images have same color distribution across all pixels.

For inspecting at high speed, an image cache 509 may be attached to the inspection stage 507. One or more rasterized static images, or a part of a rasterized static image, for example, can be stored in the image cache 509 to avoid repeatedly reading the image(s) or the part of the image by the retrieving stage 505.

Figure 7:
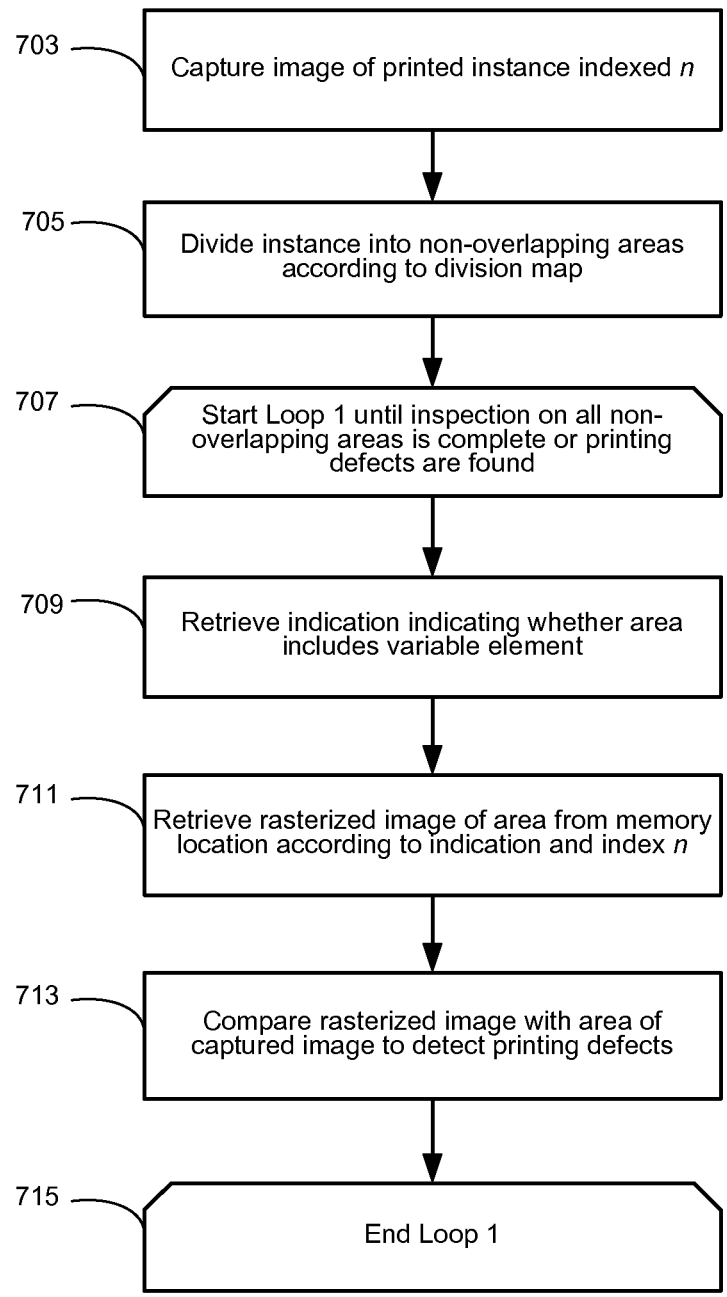
FIG. 7 is a flow chart depicting an example method embodiment for inspecting a job of variable-data printing using a data structure prepared for inspecting.

An example method carried out by the inspection subsystem 109 for inspecting a job of variable-data printing is shown in FIG. 7. The job of variable-data printing includes printing a sequence of variable instances for a page represented by a page layout script. The method shown in FIG. 7 comprises steps for detecting printing defects on a printed instance having an instance identifier, denoted as index n, in the printing sequence.

At block 703, an image of the printed instance is captured using an imaging device included in the inspection subsystem 109.

At block 705, the printed instance is divided into multiple non-overlapping areas according to a division map prepared for the page. The non-overlapping areas include one or more areas that each includes only static graphics, i.e., only one or more static element and/or parts thereof, and one or more areas that each includes at least one part of at least one variable element.

Block 707 defines the start of a loop for inspecting each of the non-overlapping areas. Each area has an area-identifier, e.g., an index determined by the division map and is inspected in the loop according to the area-identifier.

At block 709, an indication is retrieved from a pre-stored data structure indicating whether the area contains only static data or the area includes at least a part of at least one variable element.

At block 711, according to the indication, a rasterized image is retrieved from a memory location. The rasterized image is a rasterized static image in the case that the area contains not even one variable part of a variable element, and is a rasterized variable image in the case that the area contains at least a variable part of a variable element (possibly with some static graphics). The memory location may be known to the inspection subsystem 109 or may be part of the indication retrieved at block 709. The retrieving of the rasterized image is according to the area-identifier of the area and, in the case that the area contains a variable element, is also according to the instance-identifier—index n—of the printed instance.

At block 713, the rasterized image retrieved at block 711 is compared to the area of the captured image. An image analysis algorithm suitable for analyzing differences between the two images is executed for detecting printing defects in the area of the printed instance.

Block 715 defines the end of the loop started at block 707 after all the non-overlapping areas have been inspected or printing defects are found in an area.

Figure 8:
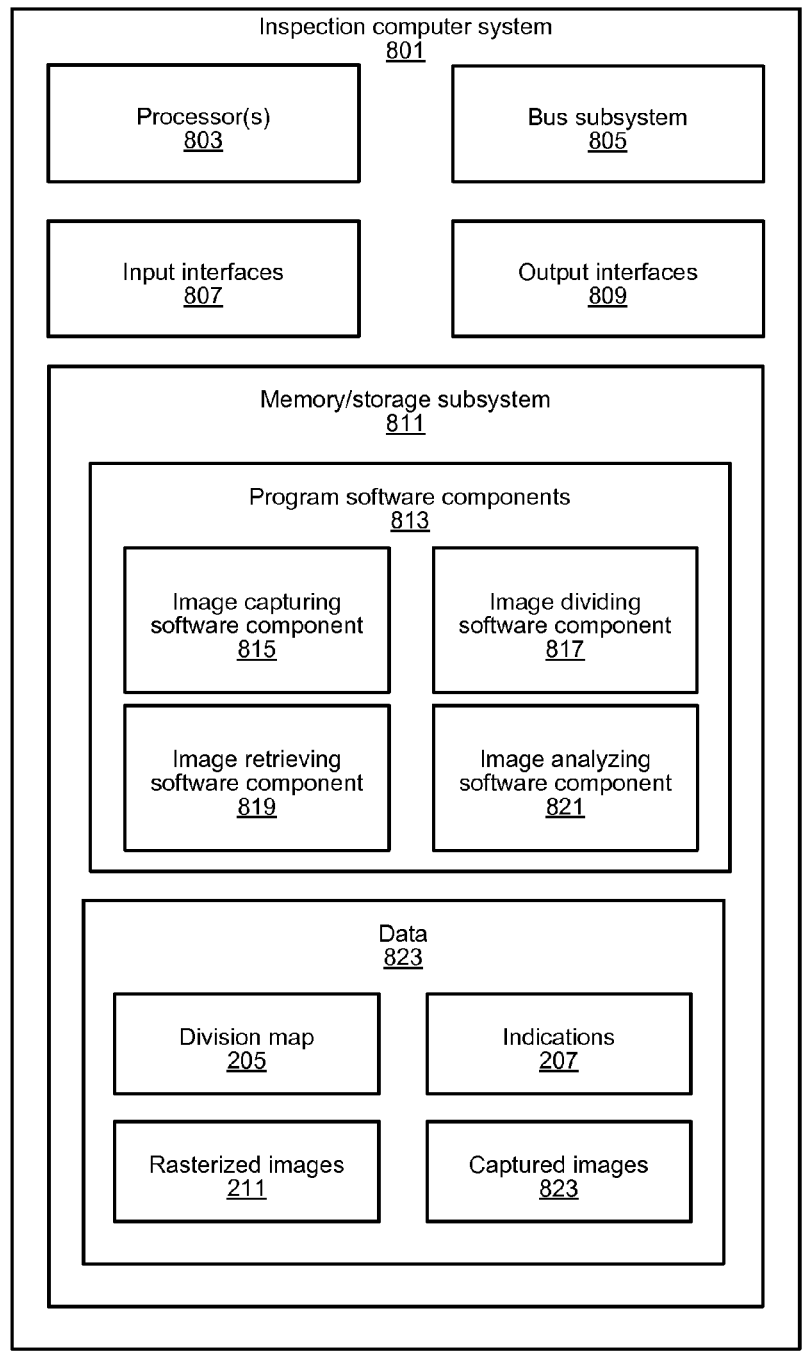
FIG. 8 is a block diagram depicting an example computer system including a carrier medium containing instructions (software modules) and data that, when executed, carry out a method embodiment for inspecting a job of variable-data printing.

FIG. 8 illustrates a representation of various components of the example inspection subsystem 109 as a computer system 801. The computer system 801 can include, but is not limited to, a processor 803, a bus subsystem 805, a memory/storage subsystem 811, an input interface 807, and an output interface 809.

The memory subsystem 807 typically includes data and/or software programs for rasterizing static and variable data for a job of printing that are immediately accessible to and/or presently operated on by processor 803. In one embodiment, the system 801 includes, e.g., in memory subsystem 811 an image capturing software component 815, an image dividing software component 817, an image retrieving software component 819, and an image analyzing software component 821. Other software components, although not shown in the illustration, may be included. Such components may include software that assists in the functioning of the computer system 801, such as an operating system.

In one implementation, the image capturing software component 815 captures an image of each printed instance of a page containing variable data through an imaging device, e.g., a camera that is part of the input interface 807. The image dividing software component 817 divides the page into a plurality of non-overlapping areas according to a division map pre-generated for the page. At least one of the non-overlapping areas contains variable data. The image retrieving software component 819 retrieves an indication for each area and a rasterized image for the area according to the indication. The image analyzing software component 821 compares the captured image of the area with the rasterized image to detect any printing defects in the area of the printed instance.

In addition to program software components, data 823 is included in the computer system 801. The data 823 include the division map 205, the indications 207, the rasterized images 211, and the captured image of every printed instance. Again, although not explicitly shown in the illustration, the data 823 may also include other data specific to the system or the application.

The term "processor" may refer to any device or portion of a device that processes electronic data from registers and/or memory to transform that electronic data into other electronic data that may be stored in registers and/or memory. A "computer", a "computing machine", and a "computing platform" may include one or more processors.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem with a main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, unless explicitly stated otherwise, also encompasses a storage system such as a disk drive unit. The processing system in some configurations may include a sound output device, and a network interface device. The memory subsystem thus includes a computer-readable medium on which is encoded logic (e.g., software) including a set of instructions to cause, when executed by one or more processors, the performing of one or more of the methods described herein. The software may reside in the hard disk or it may also reside, completely or at least partially, within the RAM and/or within the processor during execution thereof by the computer system. Thus, the memory and the processor also constitute a computer-readable medium on which is encoded logic, e.g., in the form of instructions.

Furthermore, a computer-readable medium may form, or be included in a computer program product.

In alternative embodiments, the one or more processors operate as a standalone device or may be connected, e.g., networked to other processor(s), in a networked deployment, the one or more processors may also operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium on which is encoded a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a tangible computer-readable medium, e.g., a computer program product. The computer-readable medium carries logic including a set of instructions that, when executed on one or more processors, causes implementing a method. Accordingly, aspects of the present invention may take the form of a method, an entirely hardware embodiment, an entirely software embodiment or an embodiment combining both software and hardware aspects. Furthermore, the present invention may take the form of medium (e.g., a computer program product on a computer-readable storage medium) configured with computer-readable program code embodied in the medium.

The software may further be transmitted or received over a network via a network interface device. While the computer readable medium is shown in an example embodiment to be a single medium, the term "computer readable medium" should be taken to include a single medium or multiple media (e.g., a centralized or distributed database, and/or associated caches and servers) that store the one or more sets of instructions. The term "computer readable medium" shall also be taken to include any medium that is capable of storing, encoding or carrying a set of instructions for execution by one or more of the processors and that cause performing any one or more of the methodologies of the present invention. A computer readable medium may take many forms, including but not limited to non-volatile media and/or volatile media. Non-volatile media includes, for example, optical, magnetic disks, and magneto-optical disks. Volatile media includes dynamic memory, such as main memory. For example, the term "computer-readable medium" shall accordingly be taken to include, but not be limited to a tangible medium such as a solid-state memory or optical or magnetic medium on which are encoded instructions, or a computer software product encoded in computer-readable tangible media It will be understood that the steps of methods discussed are performed in one embodiment by an appropriate processor (or processors) of a processing (i.e., computer) system executing instructions stored in storage. It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly it should be understood that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Unless otherwise specified, the use of the ordinal adjectives "first", "second", "third", etc., to describe a common object, merely indicate that different instances of like objects are being referred to, and are not intended to imply that the objects so described must be in any given sequence, either temporally, spatially, in ranking, or in any other manner.

Any discussion of prior art in this specification should in no way be considered an admission that such prior art is widely known, is publicly known, or forms part of the general knowledge in the field.

In the claims below and the description herein, any one of the terms "comprising", "comprised of", or "which comprises" is an open term that means "including at least the elements/features that follow, but not excluding others." Thus, the term comprising, when used in the claims, should not be interpreted to limit the means or elements or steps listed thereafter. For example, the scope of the expression, "a device comprising A and B" should not be limited to devices consisting only of elements A and B. Any one of the terms "including" or "which includes" or "that includes" as used herein is also an open term that also means "including at least the elements/features that follow the term, but not excluding others." Thus, "including" is synonymous with and means comprising.

Thus, while there has been described what are believed to be preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Hence, although this invention has been described with respect to specific embodiments, those embodiments are illustrative only. No limitation with respect to the embodiments is intended or should be inferred. Numerous variations and modifications may be effected without departing from the true spirit and scope of the novel concept of the invention, and it is intended that the scope of the invention be defined by the claims appended hereto.

I claim:

1. A method of operating an inspection system for inspecting a job of printing, the printing to generate a sequence of printed instances of a page, each printed instance having an instance-identifier in the sequence, the page including a plurality of elements including one or more static elements that are fixed from instance to instance and one or more variable elements that vary from instance to instance, the inspecting to detect any printing defects in a printed instance, the method comprising:

capturing an image of the printed instance;

dividing the page into multiple non-overlapping areas, the dividing using a division map prepared for the page, the non-overlapping areas including one or more areas that each does not include even one variable part of any variable element, and one or more areas that each includes variable graphics comprising at least a variable part of at least one variable element, each non-overlapping area having an area-identifier according to the division map;

for each of the non-overlapping areas:
retrieving an indication from a pre-stored data structure prepared by a data-structure-forming method, the retrieved indication indicating whether the area is a static area that includes no variable data or the area includes at least a part of at least one variable element;
retrieving a rasterized image from a memory location according to the indication, the rasterized image being generated by rasterizing each element and element part in the area of the page;
comparing the rasterized image with the area of the captured image to detect any printing defects in the area of the printed instance, wherein the retrieving of the rasterized image depends on the retrieved indication, and comprises:
in the case that the indication indicates that the area is a static area that does not include any variable element or any variable part thereof, retrieving a rasterized static image from a first memory location, the rasterized static image being generated by rasterizing the one or more element and element parts in the static area of the page; and
in the case that the indication indicates that the area is a variable area that includes, together with any static data, at least a variable part of at least one variable element, retrieving a rasterized variable image from a second memory location, the rasterized variable image retrieved form a set of rasterized variable images that each includes one instance of any included variable element or variable part, the determination using the instance-identifier of the printed instance in the sequence, and wherein the first memory location and the second memory location are accessed using the area-identifier of the area according to the division map.

2. A method as recited in claim 1, wherein the indication includes one or both of the first memory location and the second memory location.

3. A method as recited in claim 1,
wherein the second memory location includes a plurality of sub-locations, each of the set of rasterized variable images being stored in one sub-location, and
wherein the retrieving of the rasterized variable image is from a sub-location determined using the instance-identifier of the printed instance.

4. A method as recited in claim 2,
wherein the indication includes the second memory location, and
wherein in the indication, the second memory location for the area being empty or not, respectively, indicated whether that the area does or does not include, respectively, any variable element or any part thereof.

5. A method as recited in claim 1, wherein the non-overlapping areas have a rectangular shape.

6. A method as recited in claim 1, wherein the division map is one dimensional.

7. A method as recited in claim 1, wherein the division map is two dimensional.

8. A method as recited in claim 1, wherein the elements of the page are each described using a page description language (PDL).

9. A method as recited in claim 1, wherein the data-structure-forming method comprises carrying out on a processing system the steps of:
generating the division map in the data structure for the page that describes the dividing the page into the multiple non-overlapping areas, including the one or more static areas and the one or more variable areas;
for each of the non-overlapping areas:
generating an indication for the area in the data structure, the indication indicating whether the area is a static area or a variable area;
generating one or a set of rasterized images for the area and storing the one or a set of rasterized images in a memory location as part of the data structure, the generating and storing according to the indication and;
storing the data structure to form the pre-stored data structure in or for the inspection system.

10. A system operative to inspect a job of printing, the printing to generate a sequence of printed instances of a page, each printed instance having an instance-identifier in the sequence, the page including a plurality of elements including one or more static elements that are fixed from instance to instance and one or more variable elements that vary from instance to instance, the inspecting to detect any printing defects in a printed instance, the system when in operation carrying out a method comprising:
capturing an image of the printed instance;
dividing the page into multiple non-overlapping areas, the dividing using a division map prepared for the page, the non-overlapping areas comprising one or more variable areas that each includes at least a part of at least one variable elements, and one or more static areas that each does not include even a part of any variable element, each non-overlapping area having an area-identifier according to the division map;
for each of the non-overlapping areas:
retrieving an indication from a pre-stored data structure prepared by a data-structure-forming method, the retrieved indication indicating whether the area is a static area or a variable data;
retrieving a rasterized image from a memory location according to the indication, the rasterized image being generated by rasterizing the element(s) in the area of the page;
comparing the rasterized image with the area of the captured image to detect any printing defects in the area of the printed instance,
wherein the retrieving a rasterized image depends on the indication and comprises:
in the case that the indication indicates that the area is a static area, retrieving a rasterized static image from a first memory location, the rasterized static image generated by rasterizing the static area of the page; and
in the case that the indication indicates that the area is a variable area, retrieving an instance of a rasterized variable image from a second memory, the instance being one of set of rasterized variable images that each represents a different rasterized instance of the variable area that includes at least one variable part, the retrieving of the instance using the instance-identifier of the printed instance in the sequence;
wherein the first memory location and the second memory location are accessed using the area-identifier of the area according to the division map.

11. A system as recited in claim 10, wherein the data-structure-forming method comprises carrying out on a processing system the steps of:
generating the division map in the data structure for the page that describes the dividing the page into the multiple non-overlapping areas, including the one or more static areas and the one or more variable areas;
for each of the non-overlapping areas:
generating an indication for the area in the data structure, the indication indicating whether the area is a static area or a variable area;
generating one or a set of rasterized images for the area and storing the one or a set of rasterized images in a memory location as part of the data structure, the generating and storing according to the indication and;
storing the data structure to form the pre-stored data structure in or for the inspection system.

* * * * *